(12) United States Patent
Fan et al.

(10) Patent No.: US 12,206,094 B2
(45) Date of Patent: Jan. 21, 2025

(54) SILICON-CARBON COMPOSITE ANODE MATERIAL, AND PREPARATION METHOD AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Xia Fan, Guangdong (CN); Changdong Li, Guangdong (CN); Zhenhua Zhang, Guangdong (CN); Linlin Mao, Guangdong (CN); Dingshan Ruan, Guangdong (CN); Yong Cai, Guangdong (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 3 days.

(21) Appl. No.: 18/372,711

(22) Filed: Sep. 26, 2023

(65) Prior Publication Data

US 2024/0014382 A1 Jan. 11, 2024

Related U.S. Application Data

(63) Continuation of application No. PCT/CN2022/092461, filed on May 12, 2022.

(30) Foreign Application Priority Data

Aug. 20, 2021 (CN) ......................... 202110962970.X

(51) Int. Cl.
 *H01M 4/36* (2006.01)
 *B09B 3/35* (2022.01)
 (Continued)

(52) U.S. Cl.
 CPC ............... *H01M 4/364* (2013.01); *B09B 3/35* (2022.01); *B09B 3/70* (2022.01); *H01M 4/386* (2013.01);
 (Continued)

(58) Field of Classification Search
 CPC .................... H01M 2004/027; H01M 10/54
 See application file for complete search history.

(56) References Cited

U.S. PATENT DOCUMENTS

2020/0377678 A1  12/2020  Browne et al.

FOREIGN PATENT DOCUMENTS

| CN | 1094695 A | 11/1994 |
| CN | 103259062 A | 8/2013 |

(Continued)

OTHER PUBLICATIONS

International Search Report of PCT Patent Application No. PCT/CN2022/092461 issued on Jul. 22, 2022.

*Primary Examiner* — Khanh T Nguyen

(57) ABSTRACT

The present disclosure belongs to the technical field of battery materials, and discloses a silicon/carbon composite anode material, and a preparation method and use thereof. The preparation method includes the following steps: S1. dissolving a graphite anode powder in an acid solution, and conducting solid-liquid separation (SLS) to obtain a precipitate; and washing and drying the precipitate, adding a reducing agent, and subjecting a resulting mixture to heat treatment to obtain a purified graphite material; and S2. mixing a modified silicon powder with the graphite material, adding a resulting mixture to a polyimide (PI)-containing (Continued)

N,N-dimethylformamide (DMF) solution, and stirring; and subjecting a resulting mixture to distillation and then to carbonization to obtain the silicon/carbon composite anode material.

15 Claims, 2 Drawing Sheets

(51) Int. Cl.

| | | |
|---|---|---|
| B09B 3/70 | (2022.01) | |
| H01M 4/38 | (2006.01) | |
| H01M 4/587 | (2010.01) | |
| H01M 10/0525 | (2010.01) | |
| H01M 10/54 | (2006.01) | |
| B09B 101/16 | (2022.01) | |
| H01M 4/02 | (2006.01) | |

(52) U.S. Cl.
CPC ....... *H01M 4/587* (2013.01); *H01M 10/0525* (2013.01); *H01M 10/54* (2013.01); *B09B 2101/16* (2022.01); *H01M 2004/021* (2013.01); *H01M 2004/027* (2013.01)

(56) References Cited

FOREIGN PATENT DOCUMENTS

| | | |
|---|---|---|
| CN | 107887666 A | 4/2018 |
| CN | 108219104 A | 6/2018 |
| CN | 108565451 A | 9/2018 |
| CN | 109524736 A | 3/2019 |
| CN | 110098443 A | 8/2019 |
| CN | 111081976 A | 4/2020 |
| CN | 112520732 A | 3/2021 |
| CN | 113036255 A | 6/2021 |

SILICON-CARBON COMPOSITE ANODE MATERIAL, AND PREPARATION METHOD AND USE THEREOF

CROSS-REFERENCE TO RELATED APPLICATIONS

The present application is a continuation application of PCT application No. PCT/CN2022/092461 filed on May 12, 2022, which claims the benefit of Chinese Patent Application No. 202110962970. X filed on Aug. 20, 2021. The contents of all of the aforementioned applications are incorporated by reference herein in their entirety.

TECHNICAL FIELD

The present disclosure belongs to the technical field of battery materials, and specifically relates to a silicon-carbon composite anode material, and a preparation method and use thereof.

BACKGROUND

Due to the advantages of high voltage, high specific capacity, superior cycling performance, light weight, and the like, lithium-ion battery (LIB) materials are widely used and have promising application prospects. A market share of LIB materials is increasing, which promotes the shift of resource demand from fossil fuels to lithium battery fuels and also makes this resource increasingly scarce.

With the rapid industrialization and development of new energy vehicles, power LIB, one of the important components, has been widely used. However, as an LIB is constantly charged and discharged during use, the performance of the LIB will be gradually attenuated, and will be degraded for use or scrapped when the attenuation reaches a specified level. At present, a recycling rate of scrapped batteries in China is still very low. In particular, with the economic development, LIBs have been used more and more widely and developed on a large scale, and the resource shortage problem and the environmental problem accordingly have become increasingly severe. The recycling of scrapped batteries has also attracted more and more attention. A large number of scrapped batteries, if not effectively recycled, will not only cause harm to the ecological environment and human health, but also cause a waste of resources. How to recycle LIBs in a green and pollution-free manner is an urgent problem in the new energy automobile industry chain.

At present, the recycling of scrapped LIBs is mainly focused on the recycling of cathode materials, and more attention is paid to the separation and purification of lithium cobalt oxide (LCO) and ternary materials. Since scrapped LIBs include 97% of graphite and other carbon materials, it is very meaningful to recover and reuse the anode graphite.

Due to high theoretical specific capacity (4,200 mAh/g at a high temperature and 3,580 mAh/g at room temperature), low delithiation potential (<0.5 v), environmental friendliness, abundant reserves, low cost, and other advantages, silicon-based anode materials are considered to be very potential LIB anode materials with high energy density. However, with the intercalation or extraction of lithium ions during a charging and discharging process, a volume of silicon in a silicon anode material expands or contracts by more than 300%. The substantial expansion and contraction cause serious damage to a structure of a silicon host material and eventually lead to the separation of an electrode active material from a current collector, making the cycling performance of a battery greatly reduced. In addition, silicon anode materials have poor electrical conductivity, which is another key factor that limits applications of silicon anode materials. Currently, the volume expansion of silicon is mainly alleviated by nanocrystallization, and the electrical conductivity is improved by amorphous carbon coating and compounding with a carbon material. The principle is that, carbon, when used as a dispersion matrix, can buffer the volume change of a silicon anode during lithium intercalation and extraction and maintain the stability of a structure, and the high electrical conductivity of carbon can improve the electrical conductivity inside a battery. In the related art, a preparation method of a silicon-carbon anode material is reported, where carbon nanotubes (CNTs) and carbon nanofibers (CNFs) are deposited on a surface of nano silicon powder or embedded among nano silicon particles to form a core, and a surface of the core is coated with a carbon layer. The silicon-carbon anode material has an initial specific capacity of more than 500 mAh/g, and a capacity retention of more than 92% after 60 cycles. However, the preparation method is too complicated and needs to be implemented by special instruments. Moreover, in the related art, a preparation method of a silicon-carbon anode material is reported, where a porous silicon material is prepared through two-stage pickling, and then the material is coated with carbon to obtain the silicon-carbon anode material. However, this method has a relatively high cost and cannot be used on a large scale. At present, commercial graphite materials are usually used to produce silicon-carbon anode materials, which requires a relatively high production cost.

SUMMARY

The present disclosure is intended to solve at least one of the technical problems existing in the prior art. In view of this, the present disclosure provides a silicon-carbon composite anode material, and a preparation method and use thereof. The method has the advantages of convenient operation, low production cost, low energy consumption, and the like, and is suitable for industrial production.

To achieve the above objective, the present disclosure adopts the following technical solutions:

A preparation method of a silicon-carbon composite anode material is provided, including the following steps:
  S1. dissolving a graphite anode powder in an acid solution, and conducting solid-liquid separation (SLS) to obtain a precipitate; and washing and drying the precipitate, adding a reducing agent, and subjecting a resulting mixture to heat treatment to obtain a purified graphite material; and
  S2. mixing a modified silicon powder with the graphite material, adding a resulting mixture to a polyimide (PI)-containing N,N-dimethylformamide (DMF) solution, and stirring; and subjecting a resulting mixture to distillation and then to carbonization to obtain the silicon-carbon composite anode material.

Preferably, in S2, the modified silicon powder may be a silicon powder modified by a silane coupling agent (SCA) solution; and the SCA solution is obtained by hydrolyzing an SCA with an aqueous acetic acid solution.

Further preferably, the modified silicon powder may be prepared as follows: hydrolyzing an SCA with an aqueous acetic acid solution, adding a resulting product to a silicon powder, and subjecting a resulting mixture to ultrasonic dispersion and drying to obtain the modified silicon powder.

The silicon powder is modified by the SCA through the following modification principle: (1) a Si-X group linked to a silicon atom is hydrolyzed to generate an oligosiloxane with Si—OH; (2) the Si-OH in the oligosiloxane forms a hydrogen bond with the —OH on a surface of a Si matrix; and (3) during a heating and curing process, a covalent bond is formed with a matrix through a dehydration reaction.

Further preferably, the SCA may be one from the group consisting of γ-methacryloxypropyltrimethoxysilane and γ-glycidoxypropyltrimethoxysilane.

Further preferably, the aqueous acetic acid solution may have a pH of 3.5 to 5.5.

Further preferably, a mass ratio of the silicon powder to the SCA solution may be 100: (1-2).

Further preferably, the ultrasonic dispersion may be conducted for 2 min to 10 min.

Preferably, in S1, the graphite anode powder may be obtained by disassembling, crushing, and sieving a scrapped LIB.

Preferably, in S1, the acid solution may be one from the group consisting of sulfuric acid and hydrochloric acid.

Preferably, in S1, the reducing agent may be at least one from the group consisting of coke, activated carbon, and black carbon.

Preferably, in S1, a specific process of the heat treatment may be as follows: mixing a dried graphite material and the reducing agent, and subjecting a resulting mixture to heat treatment in a chlorine atmosphere.

Further preferably, the dried graphite material and the reducing agent are mixed in a furnace, nitrogen is first introduced into the furnace to replace air in the furnace, a temperature in the furnace is increased, and then chlorine is introduced instead of nitrogen for heat treatment. In the chlorine atmosphere, impurities will form chlorides and complexes in a gaseous or condensed phase and escape, thereby purifying the graphite material.

Preferably, in S1, the heat treatment may be conducted at 1,000° C. to 1,200° C. for 2 h to 5 h.

Preferably, in S2, a mass ratio of the graphite material to the modified silicon powder may be (6-9):1.

Preferably, in S2, the distillation may be vacuum distillation.

Preferably, in S2, the modified silicon powder may be mixed with the graphite material to obtain a mixed powder; and a mass ratio of the mixed powder to the PI may be (98-90):(10-20).

Preferably, in S2, a solid-to-liquid ratio of PI to DMF in the PI-containing DMF solution may be 1: (8-12) g/ml.

Preferably, in S2, the carbonization may be conducted at 500° C. to 800° C. for 4 h to 10 h.

A silicon-carbon composite anode material prepared by the preparation method is provided. At a voltage of 0.01 V to 2 V and a current density of 100 mA/g, the silicon-carbon composite anode material demonstrates a specific capacity of 670 mAh/g to 760 mAh/g for the initial lithium intercalation, a specific capacity of 530 mAh/g to 610 mAh/g for the initial lithium deintercalation, an initial charge and discharge efficiency of 80% to 81%, and a capacity retention of 95% to 97% after 50 cycles.

A battery including the silicon-carbon composite anode material is provided.

Compared with the prior art, the present disclosure has the following beneficial effects.

1. The present disclosure not only uses acid leaching to purify the recovered graphite anode powder, but also uses a reducing agent to conduct heat treatment in a chlorine atmosphere to further purify the recovered graphite anode powder, thereby improving a purity of the recovered graphite powder. Moreover, a modified silicon powder and a PI-containing DMF solution are added. In the modified silicon powder, one end of SCA is grafted on a surface of a silicon powder through a covalent bond, and the other end is cross-linked with PI. Therefore, the SCA can serve as a bridge between the PI and the surface of the silicon powder to improve the compatibility and adhesion between the silicon powder and the PI, which improves the mechanical performance of the silicon powder material and thus improves the performance of the silicon-carbon composite.

2. In the present disclosure, an anode material of a scrapped LIB is used as a raw material to synthesize a silicon-carbon composite through recycling. The method has a low cost and a prominent purification effect, and the prepared silicon-carbon composite shows excellent cycling performance. The present disclosure achieves the further utilization of waste resources, plays a major role in environmental protection and resource reutilization, and has promising industrialization prospects.

3. The method of the present disclosure can use a wide variety of graphite raw materials, and has low dependence on a source of the graphite raw material. One or more types of recovered graphite can be used in combination, which further reduces a manufacturing cost of a silicon-carbon composite and improves the application value of waste graphite.

4. The method of the present disclosure adopts a PI-containing DMF solution, where PI is a carbon source widely available. Due to the presence of nitrogen in PI, after PI is carbonized, the nitrogen doping for the carbon material is achieved to form a stable conductive network, which enhances the electrical conductivity of silicon and ultimately improves the cycling performance of a battery.

5. At a voltage of 0.01 V to 2 V and a current density of 100 mA/g, the silicon-carbon composite prepared by the method of the present disclosure demonstrates a specific capacity of 670 mAh/g to 760 mAh/g for the first lithium intercalation, a specific capacity of 530 mAh/g to 610 mAh/g for the first lithium deintercalation, an initial charge and discharge efficiency of 80% to 81%, and a capacity retention of 95% to 97% after 50 cycles. The silicon-carbon composite of the present disclosure has performance comparable to that of a silicon-carbon composite prepared from commercial graphite, and the composite of the present disclosure can be used to meet the requirement of LIBs for high energy density.

DETAILED DESCRIPTION

Figure 1:
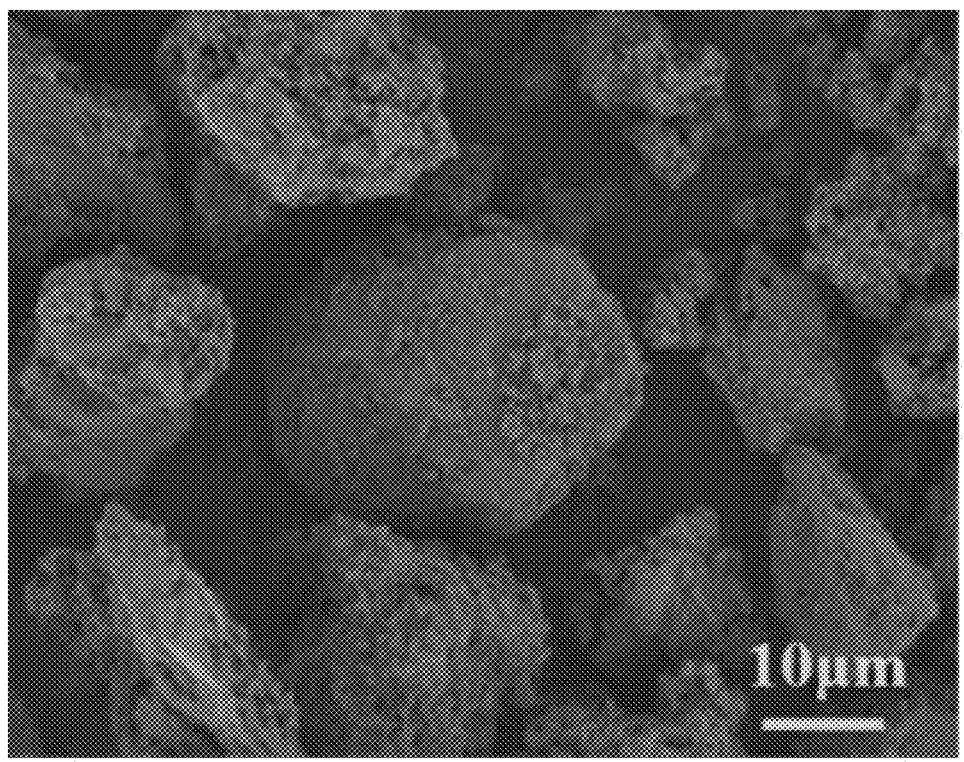
FIG. 1 is a scanning electron microscopy (SEM) image of the silicon-carbon composite prepared in Example 1.

The concepts and technical effects of the present disclosure are clearly and completely described below in conjunction with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

In this example, a silicon-carbon composite was prepared through the following specific steps:
S1. Housings of scrapped LIBs were removed, positive and negative electrode sheets were separated, and about 500 g of negative electrode sheets were collected for later treatment; and recovered negative electrode sheets were crushed for 15 min at a rotational speed of 34,000 r/min, and then sieved through a 300-mesh sieve such that copper foil and a graphite anode powder were separated to obtain about 380 g of graphite anode powder.
S2. The 380 g of graphite anode powder was added to a 5 mol/L sulfuric acid solution, and a resulting mixture was stirred for 6 h and then subjected to SLS to remove residual metal ions; a resulting solid precipitate was repeatedly washed with deionized water and absolute ethanol until a resulting filtrate was neutral (pH=7), and then dried at 60° C. for 12 h to obtain about 300 g of a graphite material; the obtained graphite material was thoroughly mixed with 0.5% (0.5% of a mass of the graphite material) of coke, and a resulting mixture was placed in a furnace; nitrogen was first introduced into the furnace to replace air in the furnace, then a furnace temperature was increased, and when the temperature reached 300° C., chlorine was introduced instead of nitrogen; and heat treatment was conducted at 900° C. for 5 h in a chlorine atmosphere to obtain 240 g of a purified graphite material.
S3. SCA kh570 (γ-methacryloxypropyltrimethoxysilane, manufacturer: Nanjing Reagent) was hydrolyzed with an aqueous acetic acid solution at pH=4; 100 g of a silicon powder was taken and added to a 200 ml beaker, and hydrolyzed kh570 was added at an amount 1.2% of the mass of the silicon powder; and a resulting mixture was subjected to ultrasonic dispersion for 5 min and then to a reaction at 80° C. for 10 h in an oven to obtain a modified silicon powder.
S4. The graphite material obtained in S2 was added to 35 g of the modified silicon powder obtained in S3 to obtain a mixed material; 35 g of PI was dissolved in 350 ml of DMF to obtain a transparent and colorless solution without residue; and the mixed material was added to the transparent and colorless solution, and a resulting mixture was subjected to high-speed dispersion for 5 h and then to vacuum distillation to remove DMF to obtain a powder.
S5. The powder obtained in S4 was sieved through a 300-mesh sieve, heated to 600° C. in a nitrogen atmosphere to undergo carbonization for 6 h, then naturally cooled to room temperature, and taken out to obtain the silicon-carbon composite anode material.

Example 2

In this example, a silicon-carbon composite was prepared through the following specific steps:
S1. Housings of scrapped LIB s were removed, positive and negative electrode sheets were separated, and about 500 g of negative electrode sheets were collected for later treatment; and recovered negative electrode sheets were crushed for 15 min at a rotational speed of 34,000 r/min, and then sieved through a 300-mesh sieve such that copper foil and a graphite anode powder were separated to obtain about 380 g of graphite anode powder.
S2. The 380 g of graphite anode powder was added to a 5 mol/L sulfuric acid solution, and a resulting mixture was stirred for 4 h and then subjected to SLS to remove residual metal ions; a resulting solid precipitate was repeatedly washed with deionized water and absolute ethanol until a resulting filtrate was neutral (pH=7), and then dried at 70° C. for 10 h to obtain about 300 g of a graphite material; the obtained graphite material was thoroughly mixed with 1% (1% of a mass of the graphite material) of coke, and a resulting mixture was placed in a furnace; nitrogen was first introduced into the furnace to replace air in the furnace, then a furnace temperature was increased, and when the temperature reached 300° C., chlorine was introduced instead of nitrogen; and heat treatment was conducted at 1,100° C. for 3 h in a chlorine atmosphere to obtain 236.4 g of a purified graphite material.
S3. SCA kh560 (γ-glycidoxypropyltrimethoxysilane) was hydrolyzed with an aqueous acetic acid solution at pH=4; 100 g of a silicon powder was taken and added to a 200 ml beaker, and hydrolyzed kh560 was added at an amount 1.6% of the mass of the silicon powder; and a resulting mixture was subjected to ultrasonic dispersion for 8 min and then to a reaction at 90° C. for 10 h in an oven to obtain a modified silicon powder.
S4. The graphite material obtained in S2 was added to 30 g of the modified silicon powder obtained in S3 to obtain a mixed material; 30 g of PI was dissolved in 350 ml of DMF to obtain a transparent and colorless solution without residue; and the mixed material was added to the transparent and colorless solution, and a resulting mixture was subjected to high-speed dispersion for 5 h and then to vacuum distillation to remove DMF to obtain a powder.
S5. The powder obtained in S4 was sieved through a 300-mesh sieve, heated to 800° C. in a nitrogen atmosphere to undergo carbonization for 4 h, then naturally cooled to room Temperature, and Taken Out to Obtain the Silicon-Carbon Composite Anode Material.

Comparative Example 1

In this comparative example, a silicon-carbon composite was prepared, and a preparation process was different from Example 1 mainly in that the pickling step was omitted. The preparation process specifically included the following steps:
S1. Housings of scrapped LIBs were removed, positive and negative electrode sheets were separated, and about 500 g of negative electrode sheets were collected for later treatment; and recovered negative electrode sheets were crushed for 15 min at a rotational speed of 34,000 r/min, and then sieved through a 300-mesh sieve such that copper foil and a graphite anode powder were separated to obtain about 380 g of graphite anode powder.
S2. The 380 g of graphite anode powder was thoroughly mixed with 0.5% (0.5% of a mass of the graphite material) of coke, and a resulting mixture was placed in a furnace; nitrogen was first introduced into the furnace to replace air in the furnace, then a furnace temperature was increased, and when the temperature reached 300° C., chlorine was introduced instead of nitrogen; and heat treatment was conducted at 900° C. for 5 h in a chlorine atmosphere to obtain a purified graphite material.

S3. SCA kh570 (γ-methacryloxypropyltrimethoxysilane, manufacturer: Nanjing Reagent) was hydrolyzed with an aqueous acetic acid solution at pH=4; 100 g of a silicon powder was taken and added to a 200 ml beaker, and hydrolyzed kh570 was added at an amount 1.2% of the mass of the silicon powder; and a resulting mixture was subjected to ultrasonic dispersion for 5 min and then to a reaction at 80° C. for 10 h in an oven to obtain a modified silicon powder.

S4. The graphite material obtained in S2 was added to 35 g of the modified silicon powder obtained in S3 to obtain a mixed material; 35 g of PI was dissolved in 350 ml of DMF to obtain a transparent and colorless solution without residue; and the mixed material was added to the transparent and colorless solution, and a resulting mixture was subjected to high-speed dispersion for 5 h and then to vacuum distillation to remove DMF to obtain a powder.

S5. The powder obtained in S4 was sieved through a 300-mesh sieve, heated to 600° C. in a nitrogen atmosphere to undergo carbonization for 6 h, then naturally cooled to room temperature, and taken out to obtain the silicon-carbon composite anode material.

COMPARATIVE EXAMPLE 2

In this comparative example, a silicon-carbon composite was prepared, and a preparation process was different from Example 2 mainly in that commercial graphite was used instead of the recovered graphite material. The preparation process specifically included the following steps:

S1. SCA kh560 was hydrolyzed with an aqueous acetic acid solution at pH=4; 100 g of a silicon powder was taken and added to a 200 ml beaker, and hydrolyzed kh560 was added at an amount 1.6% of the mass of the silicon powder; and a resulting mixture was subjected to ultrasonic dispersion for 8 min and then to a reaction at 90° C. for 8 h in an oven to obtain a modified silicon powder.

S2. 300 g of a commercial graphite powder was taken and added to 30 g of the modified silicon powder obtained in the above step to obtain a mixed material; 35 g of PI was dissolved in 350 ml of DMF to obtain a transparent and colorless solution without residue; and the mixed material was added to the transparent and colorless solution, and a resulting mixture was subjected to high-speed dispersion for 5 h and then to vacuum distillation to remove DMF to obtain a powder.

S3. The powder obtained in S2 was sieved through a 300-mesh sieve, heated to 800° C. in a nitrogen atmosphere and kept at the temperature for 4 h, then naturally cooled to room temperature, and taken out to obtain the silicon-carbon composite anode material.

Test Example

Button batteries were prepared from the silicon-carbon composite anode materials obtained in the examples and comparative examples, and electrical tests were conducted, which were specifically as follows:

Each of the silicon-carbon composite anode materials prepared in Examples 1 and 2 and Comparative Examples 1 and 2, conductive black carbon, and polyvinylidene fluoride (PVDF) were mixed in a mass ratio of 92:2:6, an appropriate amount of N-methylpyrrolidone (NMP) was added, and a resulting mixture was stirred for a specified time to obtain an anode slurry; the slurry was uniformly coated on copper foil and dried at 85° C. for a specified time, and then the electrode sheet was punched; the punched electrode sheet was vacuum-dried at 100° C. for 12 h in a vacuum drying oven; the electrode sheet, diaphragm, lithium sheet, electrolyte, positive and negative cases were assembled in a specified order in a glove box to obtain a CR2430 button battery; and the assembled battery stood for 3 h for test.

The battery was tested under the following conditions: room temperature: 25° C., charging and discharging voltage: 0.01 V to 2.0 V, and current density: 100 mA/g. Test results were shown in Table 1.

TABLE 1

Comparison of electrochemical performance among the examples and comparative examples

| | Specific capacity for the first lithium intercalation (mAh/g) | Specific capacity for the first lithium deintercalation (mAh/g) | Initial charge and discharge efficiency/% | Capacity retention after 50 cycles/% |
|---|---|---|---|---|
| Example 1 | 706.1 | 569.8 | 80.7 | 95.9 |
| Example 2 | 673.7 | 540.3 | 80.2 | 95.7 |
| Comparative Example 1 | 567.6 | 428.0 | 75.4 | 86.8 |
| Comparative Example 2 | 670.2 | 575.9 | 80.4 | 96.2 |

It can be seen from Table 1 that the composites prepared in Examples 1 and 2 had a specific capacity of 670 mAh/g to 750 mAh/g for the initial lithium intercalation, a specific capacity of 520 mAh/g to 600 mAh/g for the initial lithium deintercalation, an initial charge and discharge efficiency of 80% to 81%, and a capacity retention of 95% to 97% after 50 cycles. Compared with Example 1, Comparative Example 1 had no pickling step, and a prepared silicon-carbon anode material had a high impurity content and a low capacity. In Comparative Example 2, because commercial graphite was used as a raw material, the prepared silicon-carbon anode material had a high capacity, a high initial charge and discharge efficiency, and a capacity retention of 96.2% after 50 cycles, which was slightly higher than that of the silicon-carbon composite anode material prepared from recovered graphite in Example 1, without an obvious performance advantage. The silicon-carbon anode material prepared from an anode material recovered from a scrapped LIB negative electrode in the present disclosure had excellent performance. It shows that the method for preparing a silicon-carbon composite anode material using a scrapped LIB negative electrode in the present disclosure has high feasibility.

Figure 2:
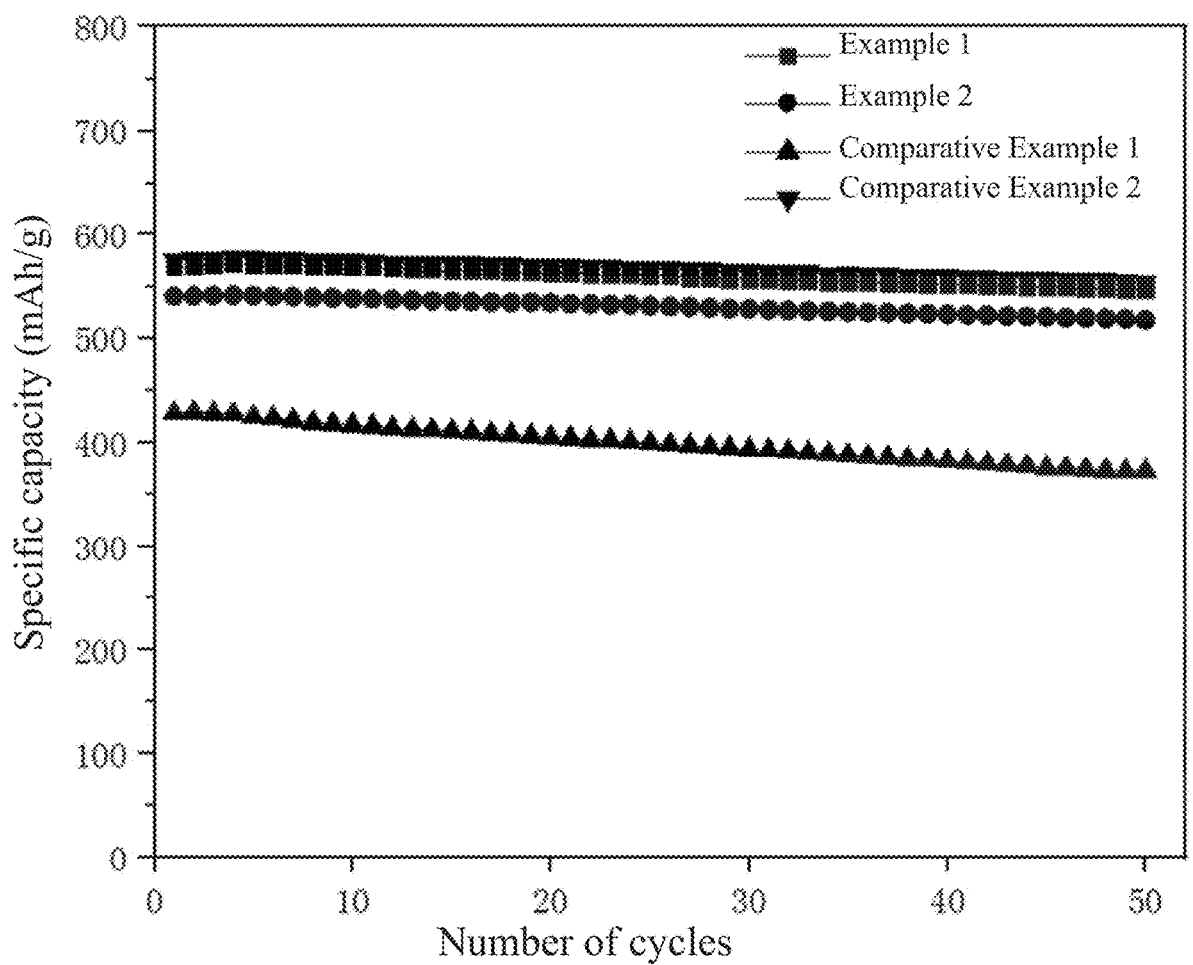
FIG. 2 is a graph showing the cycling performance of the silicon-carbon composites prepared in Examples 1 and 2 and Comparative Examples 1 and 2 at a current density of 100 mA/g.

FIG. 1 is an SEM image of the silicon-carbon composite prepared in Example 1, and it can be seen from the image that nano-silicon particles are uniformly dispersed in the silicon-carbon composite prepared in Example 1. FIG. 2 shows cycling performance curves of the silicon-carbon composites prepared in Examples 1 and 2 and Comparative Examples 1 and 2 at a current density of 100 mA/g, and it can be seen from the figure that the silicon-carbon composite prepared in Example 1 has prominent cycling stability, high cycling performance, and a capacity retention of 95.9% after 50 cycles, which shows no significant performance difference from the product prepared from commercial graphite in Comparative Example 2 and has promising application prospects.

The examples of present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A preparation method of a silicon-carbon composite anode material, comprising the following steps:
   (S1) dissolving a graphite anode powder in an acid solution, and conducting solid-liquid separation- to obtain a precipitate; and washing and drying the precipitate, adding a reducing agent, and subjecting a resulting mixture to heat treatment to obtain a purified graphite material; wherein the heat treatment is heating the resulting mixture of a dried precipitate and the reducing agent in a chlorine atmosphere; and
   (S2) mixing a modified silicon powder with the graphite material, adding to a polyimide-containing N,N-dimethylformamide solution, and stirring; and subjecting a resulting mixture to distillation and then to carbonization to obtain the silicon/carbon composite anode material; the modified silicon powder is a silicon powder modified by a silane coupling agent solution; and the silane coupling agent solution is obtained by hydrolyzing a silane coupling agent with an aqueous acetic acid solution; the silane coupling agent is one selected from the group consisting of γ-methacryloxypropyltrimethoxysilane and γ-glycidoxypropyltrimethoxysilane.

2. The preparation method according to claim 1, wherein a mass ratio of the silicon powder to the silane coupling agent solution is 100: (1–2).

3. The preparation method according to claim 1, wherein in S1, the graphite anode powder is obtained by disassembling, crushing, and sieving a scrapped lithium-ion battery.

4. The preparation method according to claim 1, wherein in S1, the reducing agent is at least one selected from the group consisting of coke, activated carbon, and black carbon.

5. The preparation method according to claim 1, wherein in S2, the modified silicon powder is mixed with the graphite material to obtain a mixed powder; and a mass ratio of the mixed powder to the polyimide is (98-90):(10-20).

6. A silicon-carbon composite anode material prepared by the preparation method according to claim 1, wherein at a voltage of 0.01 V to 2 V and a current density of 100 mA/g, the silicon-carbon composite anode material has a specific lithium intercalation capacity of 670 mAh/g to 760 mAh/g, a specific lithium deintercalation capacity of 530 mAh/g to 610 mAh/g, an initial charge-discharge efficiency of 80% to 81%, and a capacity retention rate of 95% to 97% after 50 cycles.

7. A silicon-carbon composite anode material prepared by the preparation method according to claim 2, wherein at a voltage of 0.01 V to 2 V and a current density of 100 mA/g, the silicon-carbon composite anode material has a specific lithium intercalation capacity of 670 mAh/g to 760 mAh/g, a specific lithium deintercalation capacity of 530 mAh/g to 610 mAh/g, an initial charge-discharge efficiency of 80% to 81%, and a capacity retention rate of 95% to 97% after 50 cycles.

8. A silicon-carbon composite anode material prepared by the preparation method according to claim 3, wherein at a voltage of 0.01 V to 2 V and a current density of 100 mA/g, the silicon-carbon composite anode material has a specific lithium intercalation capacity of 670 mAh/g to 760 mAh/g, a specific lithium deintercalation capacity of 530 mAh/g to 610 mAh/g, an initial charge-discharge efficiency of 80% to 81%, and a capacity retention rate of 95% to 97% after 50 cycles.

9. A silicon-carbon composite anode material prepared by the preparation method according to claim 4, wherein at a voltage of 0.01 V to 2 V and a current density of 100 mA/g, the silicon-carbon composite anode material has a specific lithium intercalation capacity of 670 mAh/g to 760 mAh/g, a specific lithium deintercalation capacity of 530 mAh/g to 610 mAh/g, an initial charge-discharge efficiency of 80% to 81%, and a capacity retention rate of 95% to 97% after 50 cycles.

10. A silicon-carbon composite anode material prepared by the preparation method according to claim 5, wherein at a voltage of 0.01 V to 2 V and a current density of 100 mA/g, the silicon-carbon composite anode material has a specific lithium intercalation capacity of 670 mAh/g to 760 mAh/g, a specific lithium deintercalation capacity of 530 mAh/g to 610 mAh/g, an initial charge-discharge efficiency of 80% to 81%, and a capacity retention rate of 95% to 97% after 50 cycles.

11. A battery comprising the silicon-carbon composite anode material according to claim 6.

12. A battery comprising the silicon-carbon composite anode material according to claim 7.

13. A battery comprising the silicon-carbon composite anode material according to claim 8.

14. A battery comprising the silicon-carbon composite anode material according to claim 9.

15. A battery comprising the silicon-carbon composite anode material according to claim 10.

* * * * *